(12) United States Patent
Cha et al.

(10) Patent No.: US 8,434,806 B2
(45) Date of Patent: May 7, 2013

(54) BARRIER NET MOUNTING STRUCTURE

(75) Inventors: Seung Kwon Cha, Whasung-Si (KR);
Tae Hoon Song, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/290,913

(22) Filed: Nov. 7, 2011

(65) Prior Publication Data
US 2012/0256437 A1  Oct. 11, 2012

(30) Foreign Application Priority Data

Apr. 8, 2011  (KR) .................. 10-2011-0032880

(51) Int. Cl.
*B60R 7/02*  (2006.01)

(52) U.S. Cl.
USPC ...................................... 296/24.4; 296/24.43

(58) Field of Classification Search ................ 296/24.4, 296/24.43
See application file for complete search history.

(56) References Cited

U.S. PATENT DOCUMENTS

| | | | |
|---|---|---|---|
| 3,799,070 A * | 3/1974 | Munson ...................... | 410/149 |
| 6,390,526 B1 * | 5/2002 | Ament et al. .............. | 296/37.16 |
| 2004/0109736 A1 | 6/2004 | Pfeifer et al. | |

FOREIGN PATENT DOCUMENTS

| | | |
|---|---|---|
| JP | 10-297377 (A) | 11/1998 |
| KR | 1020030016968 (A) | 3/2003 |
| KR | 10-2007-0052805 A | 5/2007 |
| KR | 10-2008-0042246 A | 5/2008 |
| KR | 1020080042246 (A) | 5/2008 |
| WO | WO 01/03973 A2 | 1/2001 |

* cited by examiner

*Primary Examiner* — Dennis Pedder
*Assistant Examiner* — Beverly Becker
(74) *Attorney, Agent, or Firm* — Morgan, Lewis & Bockius LLP

(57) ABSTRACT

A barrier net mounting structure may include a roof bracket provided on a head lining, and a hook provided on a lateral portion of a barrier net and inserted into the roof bracket, wherein the hook includes a rod having one end provided on the lateral portion of the barrier net, and the other end inserted into the roof bracket, and a locking portion and a stopper portion which may be provided on the other end of the rod in a spaced state therebetween, wherein one end of the locking portion may be locked to an inner surface of the roof bracket, and one end of the stopper portion may be supported by an outer surface of the roof bracket.

15 Claims, 9 Drawing Sheets

BARRIER NET MOUNTING STRUCTURE

CROSS-REFERENCE TO RELATED APPLICATION

The present application claims priority to Korean Patent Application No. 10-2011-0032880, filed on Apr. 8, 2011 in the Korean Intellectual Property Office, the entire contents of which is incorporated herein for all purposes by this reference.

BACKGROUND OF THE INVENTION

1. Field of the Invention

The present invention relates to a barrier net mounting structure for vehicles, and more particularly, to a barrier net mounting structure which is installed at a cargo compartment of a vehicle to protect passengers sitting on a rear seat from frights freight.

2. Description of Related Art

In general, a car is partitioned into a passenger space and a trunk space for loading a fright therein. A sport utility vehicle (SUV) includes an integrated passenger/cargo space.

For the SUV, there is a problem in that when the vehicle is suddenly stopped on the way, the fright loaded in the cargo space is leaned in a forward direction, so that it is moved to the passenger space or collides with a passenger's head to inflict an injury on the passenger.

In order to solve such a problem, a barrier net is installed between the passenger space and the cargo space.

A barrier net in the related art includes a net made of strings or wires twisted or tied together, with small spaces such as mesh being formed between them, hooks provided at both upper ends of the net and mounted on a fixing rod which is installed on a head lining between a rear seat of a passenger space and a cargo space, and elastic locking clips provided at both lower ends of the net and locked into a luggage trim.

According to such a barrier net in the related art, the net is tightly stretched by pulling both lower ends of the net with the elastic force of the locking clips, while both upper ends are fastened to the fixing rod by the hooks.

However, in the barrier net according to the related art, the hooks are possibly released from the fixing rod by vibration of the vehicle or shock of the fright loaded in the cargo space, so that the fright will collide with the passenger's head to inflict an injury on the passenger or the fright can be damaged.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a barrier net mounting structure capable of preventing hooks from being released by improving the hooks provided on upper ends of a barrier net, and a roof bracket for mounting the hooks.

In one aspect of the present invention, the barrier net mounting structure may include a roof bracket provided on a head lining, and a hook provided on a lateral portion of a barrier net and inserted into the roof bracket, wherein the hook may include a rod having one end provided on the lateral portion of the barrier net, and the other end inserted into the roof bracket, and a locking portion and a stopper portion which may be provided on the other end of the rod in a spaced state therebetween, wherein one end of the locking portion may be locked to an inner surface of the roof bracket, and one end of the stopper portion may be supported by an outer surface of the roof bracket.

The locking portion and the stopper portion may have a diameter larger than that of the rod.

The one end of the rod may be inserted into a receiving hole formed on the lateral portion of the barrier net, and may be fixed to the barrier net by a fixing pin penetrating the one end of the rod through the barrier net.

A reinforcing member may be provided between the receiving hole and the rod and fixed to the rod by the fixing pin, wherein a circumferential surface of the reinforcing member may be provided with an engaging boss which may be coupled to an engaging groove formed on a circumferential surface of the receiving hole in the lateral portion of the barrier net.

The rod, the locking portion and the stopper portion may be formed in a unitary body.

The roof bracket may include a mounting portion provided with an inserting surface having an inserting hole, into which the other end of the hook may be inserted, a seating surface having a seating hole, on which the other end of the hook may be seated, and a bent surface formed between the inserting surface and the seating surface in a stepped portion and having a connecting hole therein to allow a movement of the hook from the inserting hole to the seating hole, and fixing portions provided at both lateral portions of the mounting portion and fixed to the head lining.

The seating surface may be disposed higher than the inserting surface in the stepped portion therebetween.

The seating hole may have a diameter smaller than that of the inserting hole, but larger than that of the rod, and the connecting hole may be provided with a locking boss protruding inwardly from one side thereof.

The barrier net mounting structure may further include a bracket cover at an inner side of the roof bracket with a predetermined space therebetween for supporting the locking portion of the hook which may be mounted on the roof bracket at the inner side of the roof bracket.

The bracket cover may have a support portion provided on an inner side of the mounting portion in a spaced state therebetween, for covering the insertion hole and the seating hole and supporting the locking portion of the hook between the bracket cover and the roof bracket, and insertion portions provided at both lateral sides of the support portion and mounted into mounting grooves formed on the fixing portion of the roof bracket.

The bracket cover may be provided with a guide boss formed on a surface of the support portion along an outer peripheral surface of the seating hole to support a circumferential surface of the locking portion of the hook.

The head lining at an outer side of the roof bracket may include a finishing cover, and the hook may be mounted on the roof bracket through a through-hole formed on the finishing cover, wherein an inner peripheral surface of the through-hole may be provided with an assembly guiding display portion.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
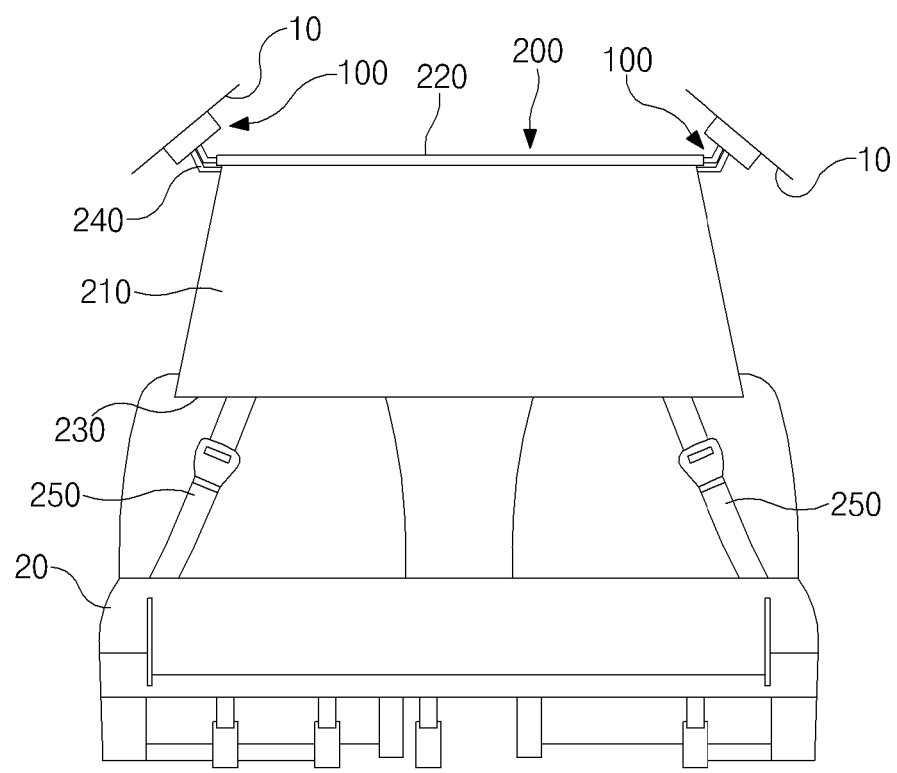
FIG. 1 is a view illustrating a barrier net mounting structure according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
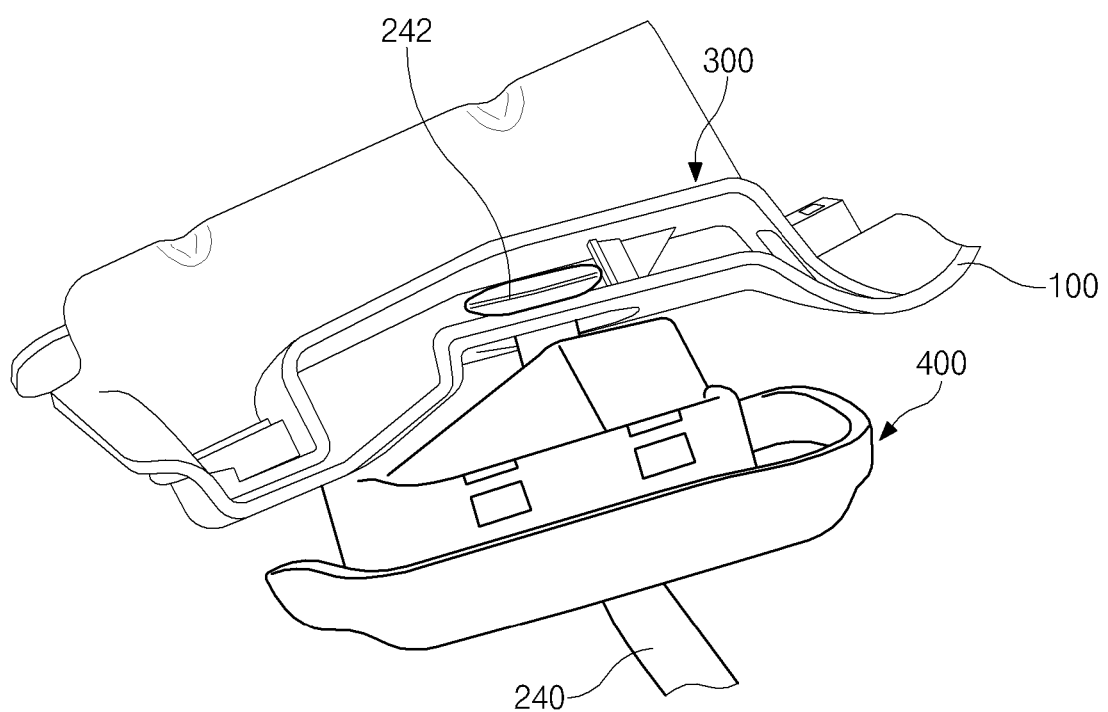
FIG. 2 is a partially enlarged perspective view of FIG. 1.

A barrier net mounting structure according to an exemplary embodiment of the present invention includes, as shown in FIGS. 1 and 2, roof brackets 100 provided on a head lining 10, a barrier net 200 having an upper end mounted on the roof brackets 100, a bracket cover 300 provided at the inside (i.e., an upper portion when seen from FIG. 2) of the roof brackets 100, and a finishing cover 400 provided at the outer side (i.e., a lower portion when seen from FIG. 2) of the roof brackets 100.

The configuration of the barrier net mounting structure according to the exemplary embodiment of the present invention will be described in greater detail.

Figure 3:
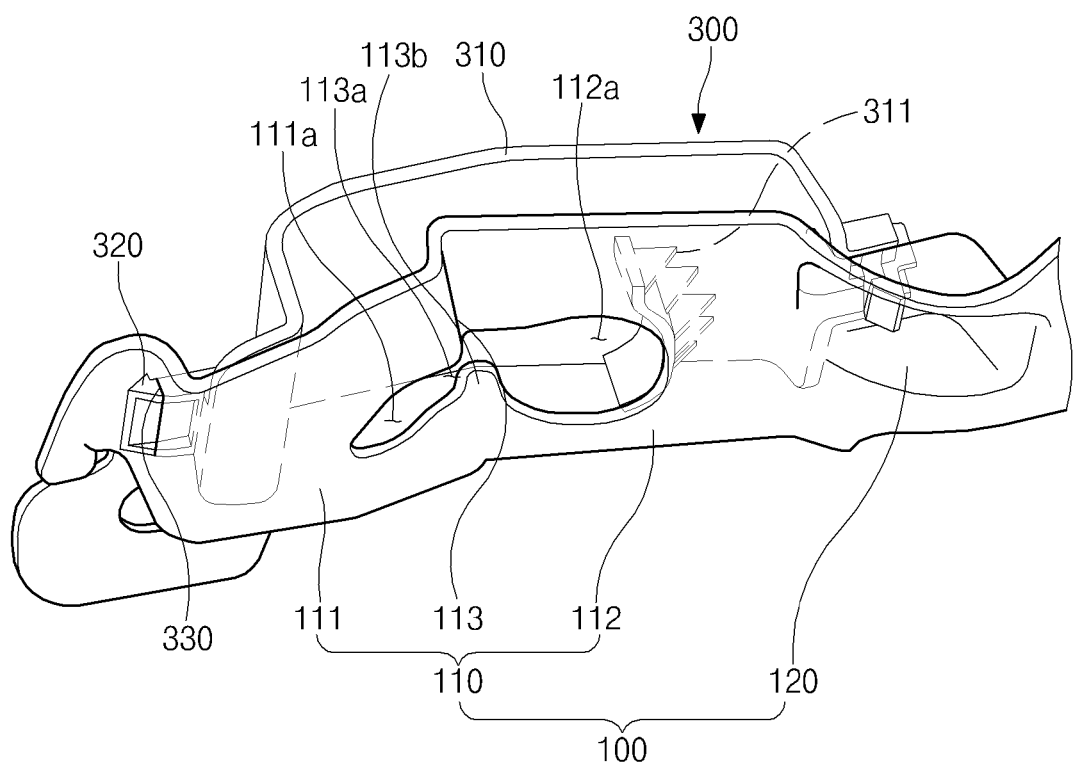
FIG. 3 is a perspective view illustrating a roof bracket according to an exemplary embodiment of the present invention.

The roof brackets 100 are mounted to both sides of the head lining 10, as shown in FIG. 3, to lock hooks of the barrier net. Each of the roof brackets 100 includes a mounting portion 110 for locking the hook of the barrier net, and a fixing portion 120 for fixing the mounting portion 110 to the head lining 10.

The mounting portion 110 is adapted to receive and lock the hook, and is provided with an inserting surface 111 having an inserting hole 111a, into which the hook is inserted, a seating surface 112 having a seating hole 112a, on which the hook is seated, and a bent surface 113 formed between the inserting surface 111 and the seating surface 112 in a stepped portion and having a connecting hole 113a to move the hook from the inserting hole 111a to the seating hole 112a.

The inserting hole 111a has a diameter larger than that of the locking portion of the hook, and the seating hole 112a has a diameter smaller than that of the locking portion of the hook, but larger than that of the rod. The connecting hole 113a is formed to be intermediate in size between the inserting hole 111a and the seating hole 112a.

That is, if the hook moves to the seating hole 112a of the seating surface 112 through the connecting hole 113a of the bent surface 113 in the state in which it is inserted into the inserting hole 111a of the inserting surface 111, the mounting portion 110 is prevented from being released outwardly since the diameter of the locking portion of the hook is larger than that of the seating hole 112a. In addition, the locking portion of the hook is prevented from moving toward the inserting hole 111a by the stepped portion of the bent surface 113.

Meanwhile, one side (a surface close to the ground) of the connecting hole 113a is provided with a locking boss 113b for locking the rod of the hook which is inserted into the seating hole 112a. The movement of the hook toward the inserting hole 111a is prevented by the locking boss 113b.

The fixing portion 120 is adapted to fix the mounting portion 110 to the head lining 10, and is provided in a vertically bent state at both sides of the inserting surface 111 and the seating surface 112 of the mounting portion 110. The fixing portion 120 is fixed to the head lining 10 by use of fixing means such as a bolt.

The barrier net 200 is adapted to protect passengers against the fright loaded in a cargo compartment, and includes a net 210 provided between a passenger space and a cargo space and made of strings or wires twisted or tied together, with small spaces being formed between them, an upper bar 220 and a lower bar 230 each provided at upper and lower ends of the net 210, hooks 240 provided at both lateral portions of the upper bar 220 and locked to the roof bracket 100, and fixing clips 250 provided at both lateral portions of the lower bar 230 and mounted to a luggage side trim 20 to tightly stretch the net 210.

The hook 240 is made of a rigid structure so as not to be released from the roof bracket 100.

Figure 4:
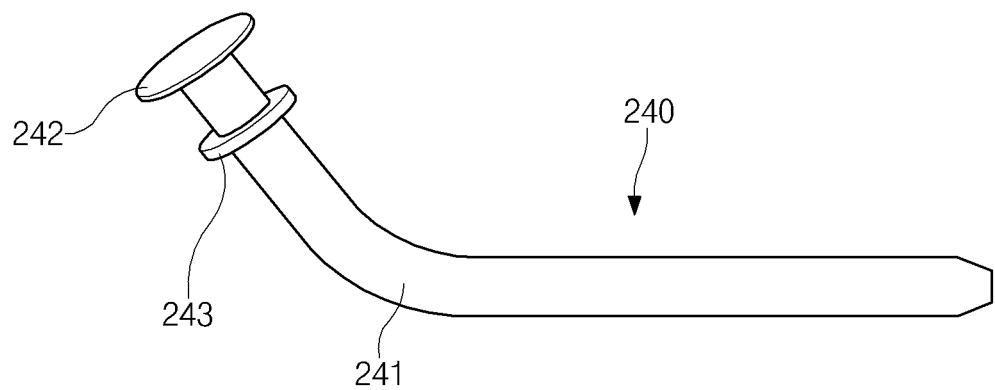
FIG. 4 is a perspective view illustrating a hook according to an exemplary embodiment of the present invention.
Figure 5:
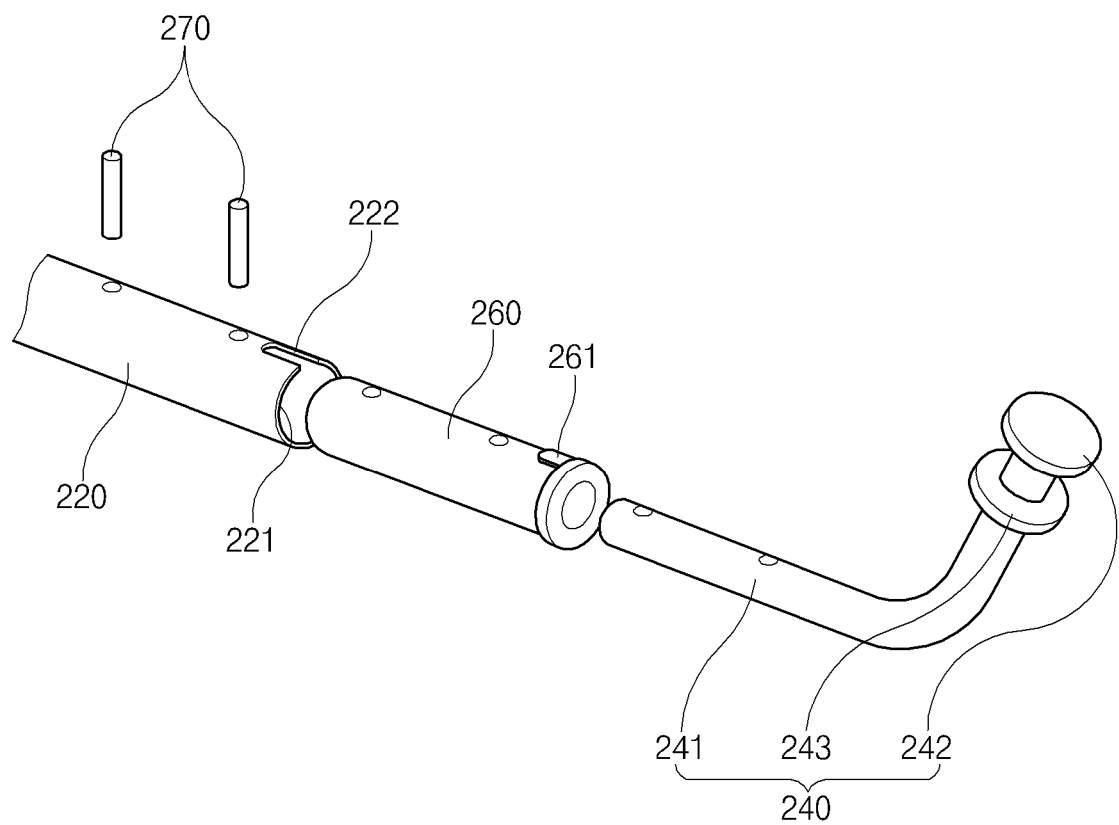
FIG. 5 is a view illustrating a fixing structure at one end of a hook according to an exemplary embodiment of the present invention.
Figure 6:
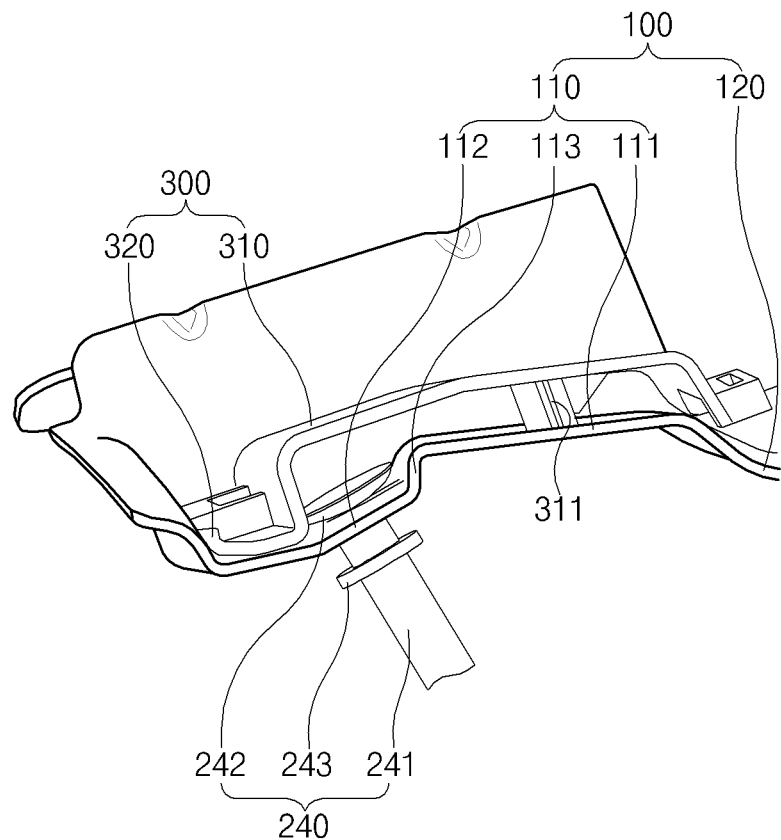
FIG. 6 is a view illustrating a seating structure at the other end of a hook according to an exemplary embodiment of the present invention.

That is, the hook 240 includes, as shown in FIGS. 4 to 6, a rod 241 having one end provided on the lateral portion of the upper bar 220 of the barrier net 200, and the other end inserted into the mounting portion 110 of the roof bracket 100, and a locking portion 242 and a stopper portion 243 which are provided on the other end of the rod 241 in a spaced state, one of the locking portion and the stopper portion being locked to an inner surface of the mounting portion 110 of the roof bracket 100, and the other being supported by an outer surface of the mounting portion 110 of the roof bracket 100.

In other words, the rod 241 is bent in an almost L-shape, and one side of the rod is inserted into the receiving hole 221 formed on the lateral portion of the upper bar 220, and is fixed by a fixing pin 270 penetrating the upper surface of the upper bar 220 of the barrier net 100, one side of the rod 241 and the lower surface of the upper bar 220.

A reinforcing member 260 is provided between the receiving hole 221 and one side of the rod 241. The lateral strength of the upper bar 220 is increased by the reinforcing member 260 to prevent the rod 241 from being released from the upper bar 220 due to the external force.

The circumferential surface of the reinforcing member 260 is provided with an engaging boss 261 which is coupled to the engaging groove 222 formed on a circumferential surface of the receiving hole 221. Engagement of the engaging groove 222 and the engaging boss 261 can easily align the hole, through which the fixing pin 270 is inserted, formed in the upper bar 220, with the hole formed in the reinforcing member 260.

The locking portion 242 and the stopper portion 243 which are formed at the other end of the rod 241 have a diameter larger than that of the rod 241.

The locking portion 242 and the stopper 243 are adapted to fix the rod 241 so that the rod does not move in a longitudinal direction while it is inserted into the mounting portion 110. The locking portion 242 prevents the rod 241 from moving in a downward direction, and the stopper portion 243 prevents the rod 241 from moving in an upward direction.

The locking portion 242 and the stopper portion 243 are formed on the other end of the rod 241 in such a way that the locking portion and the stopper portion are spaced apart from each other by the stepped portion of the mounting portion 110, that is, the length of the bent surface 113.

The rod 241, the locking portion 242 and the stopper portion 243 may be formed in a unitary body, which can easily manufacture the hook 240.

Figure 7:
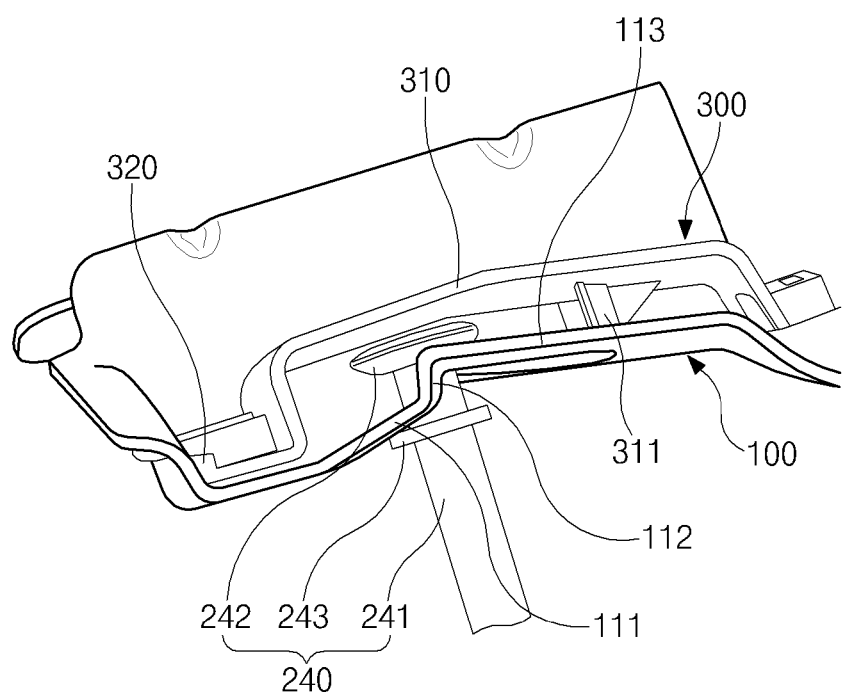
FIG. 7 is a view illustrating a using state of a hook mounted on a roof bracket according to an exemplary embodiment of the present invention.

According to the hook 240 having the above configuration, as shown in FIG. 7, if the locking portion 242 penetrates the inserting hole 111a formed in the inserting surface 111 of the mounting portion 110, and then is moved to the connecting hole 113a and the seating hole 112a by use of the rod 241 between the locking portion 242 and the stopper portion 243, the locking portion 242 is locked to the upper surface (an inner peripheral surface) of the seating hole 112a, and the stopper portion 243 is locked to the lower surface (an outer peripheral surface) of the seating hole 112a, thereby maintaining the rigid fixing state.

The inner lateral portion of the roof bracket 100 is provided with the bracket cover 300 to support the other end of the hook 240.

Figure 8:
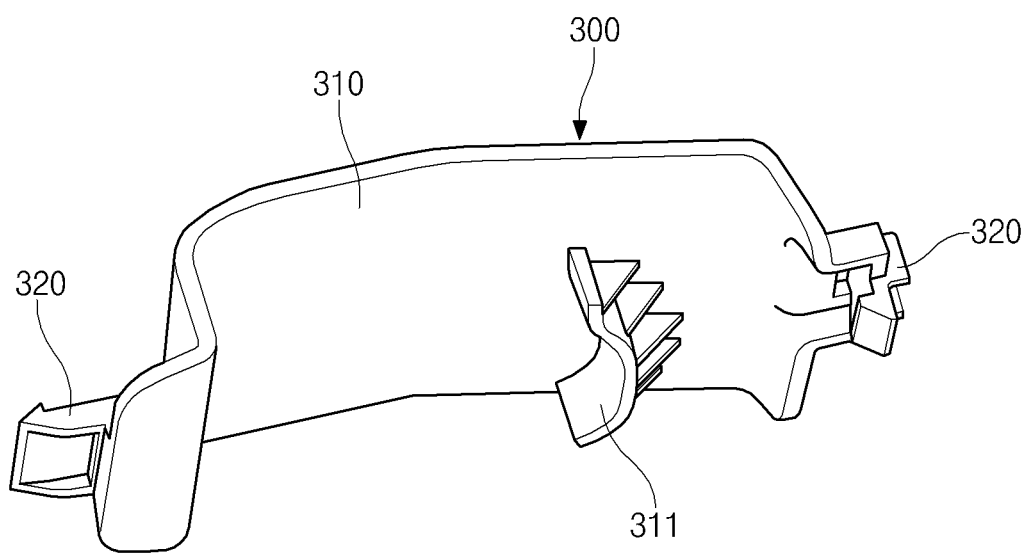
FIG. 8 is a view illustrating a bracket cover according to an exemplary embodiment of the present invention.

As shown in FIG. 8, the bracket cover 300 includes a support portion 310 for supporting and guiding the end of the hook 240 to the seating hole 112a, and insertion portions 320 provided at both ends of the support portion 310 and inserted into the mounting groove 330 formed on the fixing portion 120. Specifically, the support portion 310 supports the locking portions 242 of the hook 240 which are spaced apart from the inner side (a side facing the head lining 10) of the mounting portion 110 of the roof bracket 100 at a desired interval and are inserted into the mounting portion 110.

That is, if the hook 240 is positioned in a vertical state from the roof bracket 100, the hook 240 can horizontally move between the bracket cover 300 and the roof bracket 100 without being locked to the bent portion 242. However, in the case where the barrier net 100 is moved by the external force, the hook 240 moves in cooperation with the barrier net 100. When the hook 240 is positioned in an inclined state from the roof bracket 100, the locking portion 242 of the hook 240 is supported and fixed by the roof bracket 100 and the bracket cover 300.

Accordingly, even though the barrier net 100 is applied by the external force, the hook 240 can be stably fixed to the roof bracket 100.

Meanwhile, the bottom surface (a surface corresponding to the hook) of the support portion 310 is provided with a guide boss 311 along the outer peripheral surface of the seating hole 112a. The guide boss 311 maintains the distance between the roof bracket 100 and the bracket cover 300, increases the strength of the support portion 310, and supports and guides the locking portion 242 of the hook 240 inserted into the inserting hole 111a to move the locking portion 242 along the seating hole 112a only.

The finishing cover 400 is provided at the outer side of the roof bracket 100 so that the roof bracket 100 is not seen from the interior of the cabin.

Figure 9:
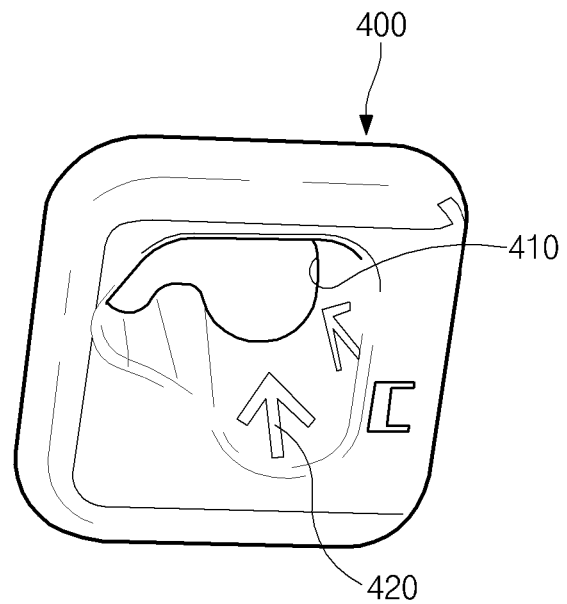
FIG. 9 is a view illustrating a finishing cover according to an exemplary embodiment of the present invention.

The finishing cover 400 is fixed to the head lining 10 on which the roof bracket 100 is mounted, as shown in FIG. 9, and the hook 240 is mounted on the roof bracket 100 through the through-hole 410 formed in the center of the finishing cover 400.

The inner peripheral surface of the through-hole 410 is provided with an assembly guiding display portion 420 to guide assembly of the hook 240. A worker can easily assemble the hook with reference to the assembly guiding display portion 420 only.

The finishing cover 400 may be made of elastic synthetic resin in order to increase a contact force between the finishing cover and the head lining 10 and to prevent the fright from being damaged.

Accordingly, the aesthetic of the barrier net is improved by installing the finishing cover 400 at the front of the roof bracket 100 to increase the merchantable quality.

With the barrier net mounting structure including the configuration according to the exemplary embodiment of the present invention, since the hook with the locking portion and the stopper portion formed at the end thereof is mounted to the roof bracket 100, even though the barrier net is violently moved by the fright, it is possible to prevent the hook 240 mounted to the roof bracket 100 from being released.

In addition, since the bracket cover 300 is mounted to the inner side (a rear portion) of the roof bracket 100, the interval between the mounting portion 110 of the roof bracket 100 and the support portion 310 of the bracket cover 300 is maintained constantly, and the hook 240 is supported so as not to be moved in the inward direction.

Further, since the finishing cover 400 is mounted at the outer side (the front) of the roof bracket 100, the merchantable quality is increased and the damage of the fright is prevented.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A barrier net mounting structure comprising:
    a roof bracket provided on a head lining; and
    a hook provided on a lateral portion of a barrier net and inserted into the roof bracket;
    wherein the hook includes:
        a rod having one end provided on the lateral portion of the barrier net, and the other end inserted into the roof bracket; and
        a locking portion and a stopper portion which are provided on the other end of the rod in a spaced state therebetween;

wherein one end of the locking portion is locked to an inner surface of the roof bracket, and one end of the stopper portion is supported by an outer surface of the roof bracket; and wherein the locking portion and the stopper portion have a diameter larger than that of the rod.

2. The barrier net mounting structure according to claim 1, wherein the one end of the rod is inserted into a receiving hole formed on the lateral portion of the barrier net, and is fixed to the barrier net by a fixing pin penetrating the one end of the rod through the barrier net.

3. The barrier net mounting structure according to claim 2, wherein a reinforcing member is provided between the receiving hole and the rod and fixed to the rod by the fixing pin.

4. The barrier net mounting structure according to claim 3, wherein a circumferential surface of the reinforcing member is provided with an engaging boss which is coupled to an engaging groove formed on a circumferential surface of the receiving hole in the lateral portion of the barrier net.

5. The barrier net mounting structure according to claim 1, wherein the rod, the locking portion and the stopper portion are formed in a unitary body.

6. The barrier net mounting structure according to claim 1, wherein the roof bracket includes:
 a mounting portion provided with an inserting surface having an inserting hole, into which the other end of the hook is inserted, a seating surface having a seating hole, on which the other end of the hook is seated, and a bent surface formed between the inserting surface and the seating surface in a stepped portion and having a connecting hole therein to allow a movement of the hook from the inserting hole to the seating hole, and
 fixing portions provided at both lateral portions of the mounting portion and fixed to the head lining.

7. The barrier net mounting structure according to claim 6, wherein the seating surface is disposed higher than the inserting surface in the stepped portion therebetween.

8. The barrier net mounting structure according to claim 6, wherein the seating hole has a diameter smaller than that of the inserting hole, but larger than that of the rod, and the connecting hole is provided with a locking boss protruding inwardly from one side thereof.

9. The barrier net mounting structure according to claim 6, further including a bracket cover at an inner side of the roof bracket with a predetermined space therebetween for supporting the locking portion of the hook which is mounted on the roof bracket at the inner side of the roof bracket.

10. The barrier net mounting structure according to claim 9, wherein the bracket cover has:
 a support portion provided on an inner side of the mounting portion in a spaced state therebetween, for covering the insertion hole and the seating hole and supporting the locking portion of the hook between the bracket cover and the roof bracket; and
 insertion portions provided at both lateral sides of the support portion and mounted into mounting grooves formed on the fixing portion of the rook bracket.

11. The barrier net mounting structure according to claim 10, wherein the bracket cover is provided with a guide boss formed on a surface of the support portion along an outer peripheral surface of the seating hole to support a circumferential surface of the locking portion of the hook.

12. The barrier net mounting structure according to claim 1, wherein the head lining at an outer side of the roof bracket includes a finishing cover, and the hook is mounted on the roof bracket through a through-hole formed on the finishing cover.

13. The barrier net mounting structure according to claim 12, wherein an inner peripheral surface of the through-hole is provided with an assembly guiding display portion.

14. A barrier net mounting structure comprising:
 a roof bracket provided on a head lining;
 a hook provided on a lateral portion of a barrier net and inserted into the roof bracket; and
 a bracket cover, provided at an inner side of the roof bracket, for supporting an end of the hook mounted on the roof bracket between the roof bracket and the bracket cover.

15. The barrier net mounting structure according to claim 14, wherein the head lining at an outer side of the roof bracket includes a finishing cover, and the hook is mounted on the roof bracket through a through-hole formed on the finishing cover.

* * * * *